United States Patent
Hart

(10) Patent No.: US 10,229,407 B2
(45) Date of Patent: Mar. 12, 2019

(54) METHOD OF PROVIDING A GATEWAY BETWEEN MOBILE DEVICES AND RADIO FREQUENCY IDENTIFICATION (RFID) ENABLED READERS

(71) Applicant: Jason Dean Hart, Fremont, CA (US)

(72) Inventor: Jason Dean Hart, Fremont, CA (US)

(*) Notice: Subject to any disclaimer, the term of this patent is extended or adjusted under 35 U.S.C. 154(b) by 0 days.

(21) Appl. No.: 15/627,440

(22) Filed: Jun. 19, 2017

(65) Prior Publication Data

US 2017/0364905 A1    Dec. 21, 2017

Related U.S. Application Data

(60) Provisional application No. 62/351,667, filed on Jun. 17, 2016.

(51) Int. Cl.
*H04W 4/02* (2018.01)
*G08C 23/04* (2006.01)
(Continued)

(52) U.S. Cl.
CPC ......... *G06Q 20/3278* (2013.01); *G06F 21/34* (2013.01); *G06K 7/10366* (2013.01); *G06K 19/07749* (2013.01); *G06Q 20/352* (2013.01); *G06Q 20/40* (2013.01); *G07C 9/00134* (2013.01); *H04B 5/0031* (2013.01); *H04B 5/0037* (2013.01); *H04L 63/0492* (2013.01); *H04W 92/06* (2013.01); *G07C 2009/0019* (2013.01); *Y02D 70/42* (2018.01)

(58) Field of Classification Search
CPC .......... G06F 21/34; G06F 21/32; G06F 21/35; G06K 19/07749; G06K 7/10366; G06K 9/00885; G06Q 20/3278; G06Q 20/352; G06Q 20/40; G06Q 20/327; G06Q 20/341; G06Q 20/409; G06Q 20/40975; H04L 63/0492; G07C 2009/00412; G07C 9/00031; G07C 9/00309; G07C 9/00571; G07C 9/00134; G07C 9/00182; G07C 9/00111; G07C 2009/00388; G07C 2009/00769; G07C 2009/00793; G07C 9/00563; H04W 4/008; H04W 12/06; H04W 4/021; H04W 4/80; G08C 23/04; H04B 5/0062; Y02D 70/00; Y02D 70/122; Y02D 70/124; Y02D 70/1262; Y02D 70/142; Y02D 70/144; Y02D 70/162; Y02D 70/166; Y02D 70/26; Y02D 70/42

See application file for complete search history.

(56) References Cited

U.S. PATENT DOCUMENTS

2005/0105734 A1*  5/2005  Buer ............... G07C 9/00007
                                                           380/270
2015/0242663 A1*  8/2015  Babu ..................... G06F 1/3215
                                                           235/380

(Continued)

*Primary Examiner* — Dionne Pendleton

(57) ABSTRACT

An RFID magnetic field powered translating device that acts as a gateway between mobile devices and radio frequency identification (RFID) enabled readers. The gateway enables the portable device to emulate access credentials for physical access, computer credentials, licenses and payment cards using Bluetooth communication between the portable mobile device and translating device; and RFID emulation at either 125 khz or 13.56 MHz between the translating device and the RFID reader.

20 Claims, 19 Drawing Sheets

(51) Int. Cl.
*H04W 4/00* (2018.01)
*G07C 9/00* (2006.01)
*G06Q 20/32* (2012.01)
*G06K 7/10* (2006.01)
*G06F 21/34* (2013.01)
*G06Q 20/40* (2012.01)
*H04L 29/06* (2006.01)
*G06Q 20/34* (2012.01)
*H04B 5/00* (2006.01)
*H04W 92/06* (2009.01)
*G06K 19/077* (2006.01)

(56) References Cited

U.S. PATENT DOCUMENTS

| | | | | |
|---|---|---|---|---|
| 2016/0015004 A1* | 1/2016 | Bonge, Jr. | ............ | A01K 27/009 |
| | | | | 119/718 |
| 2016/0241999 A1* | 8/2016 | Chin | .................... | H04W 4/021 |
| 2018/0075722 A1* | 3/2018 | Parma | ................ | G08B 13/2471 |

\* cited by examiner

METHOD OF PROVIDING A GATEWAY BETWEEN MOBILE DEVICES AND RADIO FREQUENCY IDENTIFICATION (RFID) ENABLED READERS

The current application claims priority to U.S. provisional application Ser. No. 62/351,667 filed on Jun. 17, 2016. The current application is filed on Jun. 19, 2017 while Jun. 17, 2017 and Jun. 18, 2017 were on a weekend.

FIELD OF THE INVENTION

The present invention generally relates to providing a gateway between mobile devices and radio frequency identification (RFID) enabled readers. More specifically, the present invention allows a user to utilize mobile devices to engage RFID enabled readers as a replacement for traditional RFID cards for physical access, computer access, licensing and payment contactless cards.

BACKGROUND OF THE INVENTION

Mobile devices have changed the process of identification, providing a more secure and convenient communication platform to authorize payments, board a plane, access information, access buildings, provide identification to others around us, and so on. Mobile devices serve as an improvement upon traditional RFID enabled identification, employee badges, access cards and payment cards.

Traditional building systems that use a dedicated RFID door reader infrastructure are not easily upgraded. For many companies that lease their facilities, these companies typically do not own the building access system and cannot upgrade the RFID door reader quickly or in a cost-effective manner. Most corporate and government building systems use RFID technology which is not easily upgraded to accommodate the use of a mobile device for secure physical access. In fact, many mobile phone vendors have implemented restrictions which prevent or restrict the use of mobile devices from being used as RFID replacement solutions. Some mobile devices simply lack the prerequisite technology to be RFID capable. Consequently, the advancements of mobile phones are not being fully utilized by traditional building systems. The present invention serves to securely enable traditional RFID door readers to interface with a wide range of mobile devices. The present invention also simplifies the communication between mobile devices and traditional RFID readers, thereby serving as a replacement or supplementation of traditional RFID cards. The present invention utilizes mobile devices and traditional RFID readers that are able to communicate with each other via a translating adapter. The translating adapter is a sticker that is mountable onto a variety of RFID readers that enables mobile devices to interface with traditional RFID readers where the mobile devices and the readers would otherwise be incompatible.

This invention is not limited to physical access door readers, but applies equally to any RFID reader such as Point of Sales contactless readers, ISO14443 Contactless computer readers, USB based multifunction printer RFID readers or any reader that employs 125 kHz or 13.56 MHz RFID contactless communication. In the case of the Point of Sale terminal with NFC technology, it requires that an RFID credit card be presented to it for authorization of payment. This current approach does not support mobile devices which are incompatible with NFC, do not possess the required RFID technology or are limited by the manufacturer from using the mobile device RFID hardware for this purpose. Further it requires devices with NFC to be presented to the NFC reader in very close range, generally less than 10 cm.

This invention enables a mobile device to communicate over a Bluetooth radio frequency to the translating device at longer distances. The translating device converts the Bluetooth communication into an RFID protocol which is understood by the Point of Sale NFC terminal such as ISO14443 with an ISO7816 data structure, thus fully emulating a contactless credit card used by Visa, Mastercard and American Express and alike. The same approach is taken for NFC and 125 khz ticketing systems whereby a mobile device can communicate over Bluetooth through the translating device which converts the mobile devices credential into a format that is understood by the ticketing systems RFID reader; this can include protocols such as MiFare, Desfire and other ISO14443 and ISO15693 application protocols.

The concept of translating devices or gateways is not new; the novelty of this translating invention is its ability to draw 100% of its power from a host low energy RFID field that outputs as low as 0.5 mA of energy and use this energy in extremely power efficient ways to power medium range radio communication with a mobile device which stores and emulates multiple credentials from a single portable computer device. Further, by employing modern public private key technology for over the air transactions the strength of the communication is far superior to the legacy card systems that the solution is replacing. One specific challenge of the invention was solving the simultaneous communication between the translating device and the host RFID reader while power harvesting from the same antenna. A further challenge is being able to regulate power harvesting while the host RFID reader is attempting to communicate with traditional RFID cards in the same field. This challenge proved especially difficult given the power needs of traditional RFID cards and the interference caused by power harvesting circuits on the translating device. Ultimately, this challenge was solved with the introduction of a wave form detection circuit that detects and determines when a card may be entering the field, allowing the translating device to adjust its power consumption through a variable control circuit.

DETAIL DESCRIPTIONS OF THE INVENTION

All illustrations of the drawings are for the purpose of describing selected versions of the present invention and are not intended to limit the scope of the present invention.

Figure 1:
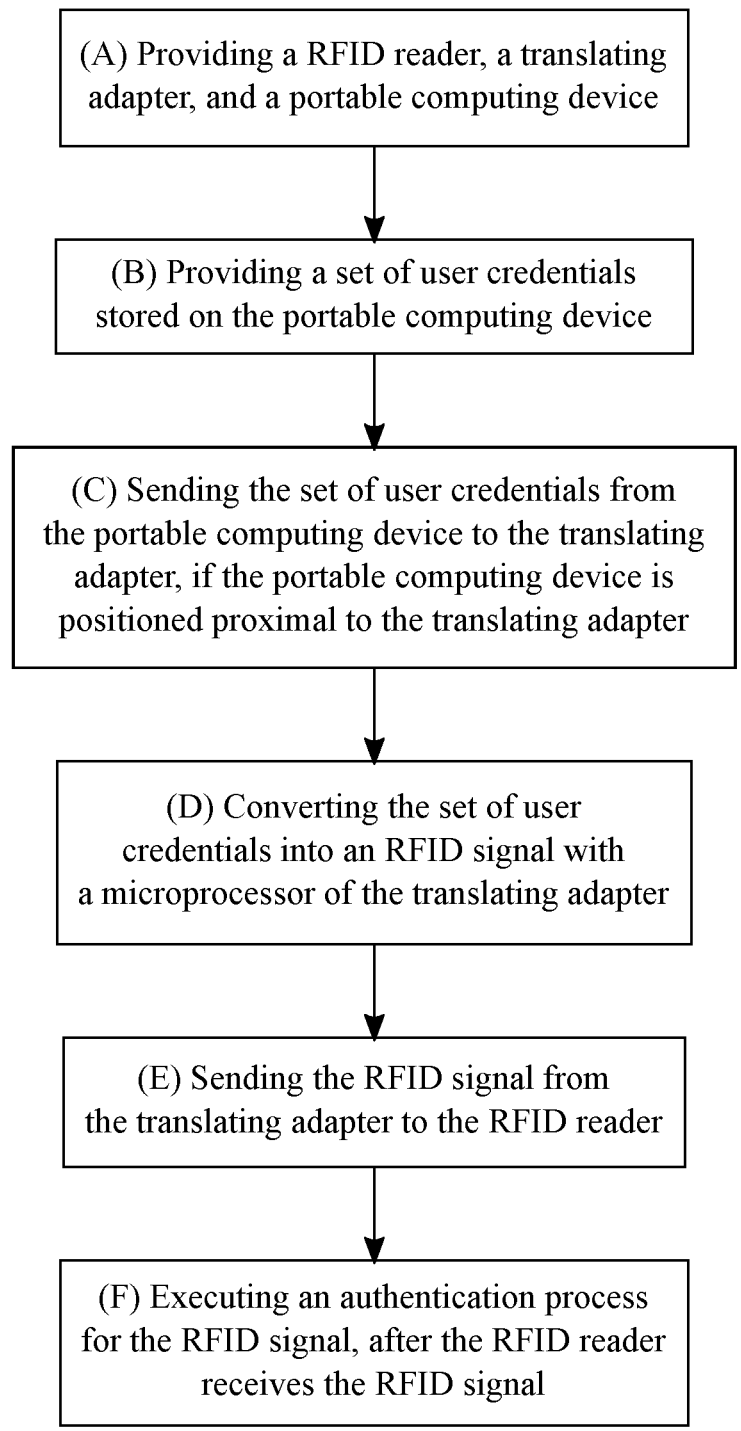
FIG. 1 is a flowchart illustrating the overall process for the present invention.

The present invention is a method of providing a gateway between mobile devices and radio frequency identification (RFID) enabled readers. More specifically, the present invention is a method of providing a gateway between mobile devices using 2.4 GHz radio frequency and magnetically induced RFID enabled readers. The present invention facilitates the use of mobile devices such as smart phones, tablets, and the like with RFID readers so that a user does not need to carry a traditional RFID card or an NFC RFID card on his or her person. Thus, the physical system used to implement the method of the present invention includes a RFID reader 1, a translating adapter 3, and a portable computing device 15 (Step A), as seen in FIG. 1. The RFID reader 1 activates the door or entrance mechanism of a building or the like. The RFID reader 1 is mounted near a point of entry in order for a user to be able to enter or exit the building upon the engagement of the portable computing device 15 and is electronically coupled to the physical access control function. In the preferred embodiment of the present invention, the physical access control function of the door or entrance mechanism includes a relay. The RFID reader 1 admits or denies a user depending on a set of user credentials 18 that correspond to the portable computing device 15.

The translating adapter 3 facilitates the communication between the portable computing device 15 and the RFID reader 1. The translating adapter 3 receives power through magnetic induction. In the preferred embodiment of the present invention the translating adapter 3 is a sticker that serves as a universal attachment a variety of RFID readers 1 and portable computing devices 15. Furthermore, the translating adapter 3 is preferably configured to be transparent or translucent, exposing the housed electronic components.

The portable computing device 15 activates the RFID reader 1 via the translating adapter 3. The portable computing device 15 is preferably a smart phone; however, it is understood that a variety of smart devices may activate the RFID reader 1. In order to verify the portable computing device 15 with a corresponding RFID reader 1, a set of user credentials 18 is stored on the portable computing device 15 (Step B). The set of user credentials 18 is unique to each portable computing device 15 and a RFID reader 1, thereby providing a secure environment within the corresponding building or corresponding mechanism. In the preferred embodiment of the present invention, the set of user credentials 18 is provided in a readily-convertible-into-RFID format. The portable computing device 15 contains a virtual wallet of RFID cards. The virtual wallet of RFID cards may contact 125 kHz, 13.56 MHz, or other credential types.

The translating adapter 3 facilitates the transmission of the set of user credentials 18 that the RFID reader 1 is readily able to receive. The translating adapter 3 receives a 125 kHz credential over 2.4 GHZ Bluetooth and retransmits the credential over 125 kHz, or in the case of ISO7816 based credentials, the translating adapter 3 creates a bidirectional communication link between the RFID reader 1 and the virtual wallet of RFID cards in the portable computing device 15, allowing the ISO7816 commands to be converted from 13.56 MHz magnetic coupling to 2.4 GHz radio communication.

The overall process for the present invention includes the following steps that are implemented with the RFID reader 1, the translating adapter 3, and the portable computing device 15. The overall process, as shown in FIG. 1, begins with the sending of the set of user credentials 18 from the portable computing device 15 to the translating adapter 3, if the portable computing device 15 is positioned proximal to the translating adapter 3 (Step C), so that the translating adapter 3 communicates with a portable computing device 15 within a given vicinity of a corresponding door or entrance. The delivery of the set of user credentials 18 to the translating adapter 3 allows the portable computing device 15 to communicate with the RFID reader 1. In order for the set of user credentials 18 to be verified by the RFID reader 1, the set of user credentials 18 is converted into an RFID signal with a microprocessor 4 of the translating adapter 3 (Step D). The microprocessor 4 of the translating adapter 3 executes software commands that facilitates the communication system of the translating adapter 3. The RFID signal is then sent from the translating adapter 3 to the RFID reader 1 (Step E) as the set of user credentials 18 on the portable computing device 15 is now verifiable by the RFID reader 1. An authentication process for the RFID signal is executed, after the RFID reader 1 receives the RFID signal (Step F). The authentication process activates the corresponding door or entrance or denies the user access.

Figure 2:
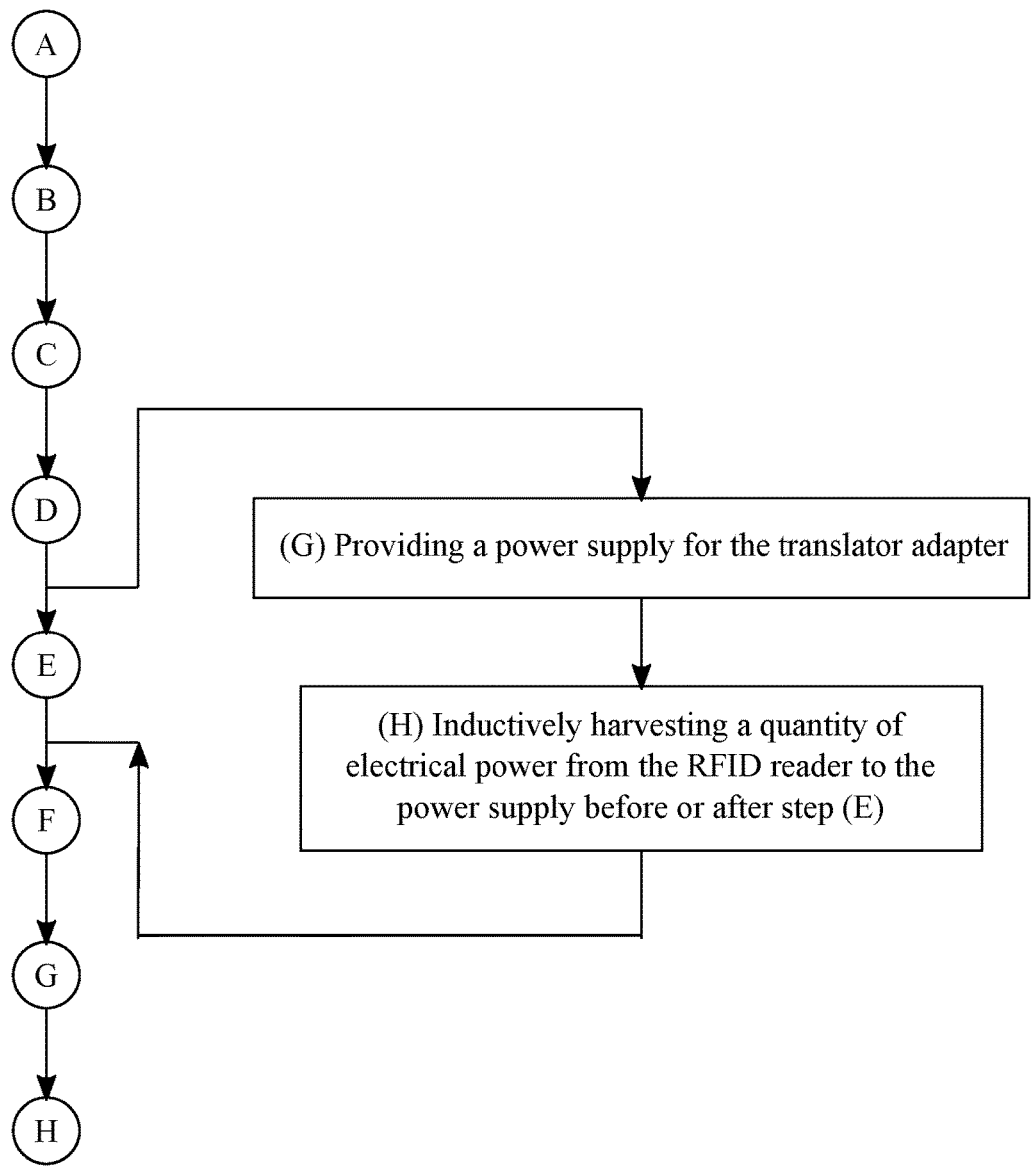
FIG. 2 is a flowchart illustrating the overall process for inductively harvesting a quantity of electrical power from the RFID reader.

In order for the translating adapter 3 to enable communication between the RFID reader 1 and the portable computing device 15, a power supply 5 for the translating adapter 3 provides the necessary power for the translating adapter 3 (Step G) to execute a variety of commands. A quantity of electrical power is inductively harvested from the RFID reader 1 to the power supply 5 before or after Step E (Step H), as shown in FIG. 2. The power supply 5 provides sufficient power for the translating adapter 3 as the power supply 5 includes at least one power inductive coupler 6, a capacitor 7, and a power bus 8. The at least one power inductive coupler 6 harvests the energy from the RFID reader 1. The at least one power inductive coupler 6 preferably accommodates communication between 13.56 MHz and 2.4 GHz high frequency transceivers. The at least one power inductive coupler 6 preferably accommodates communication between 125 kHz and 2.4 GHz high frequency transceivers. The capacitor 7 stores harvested energy. The power bus 8 distributes the stored energy to the electronic components of the translating adaptor.

Figure 3:
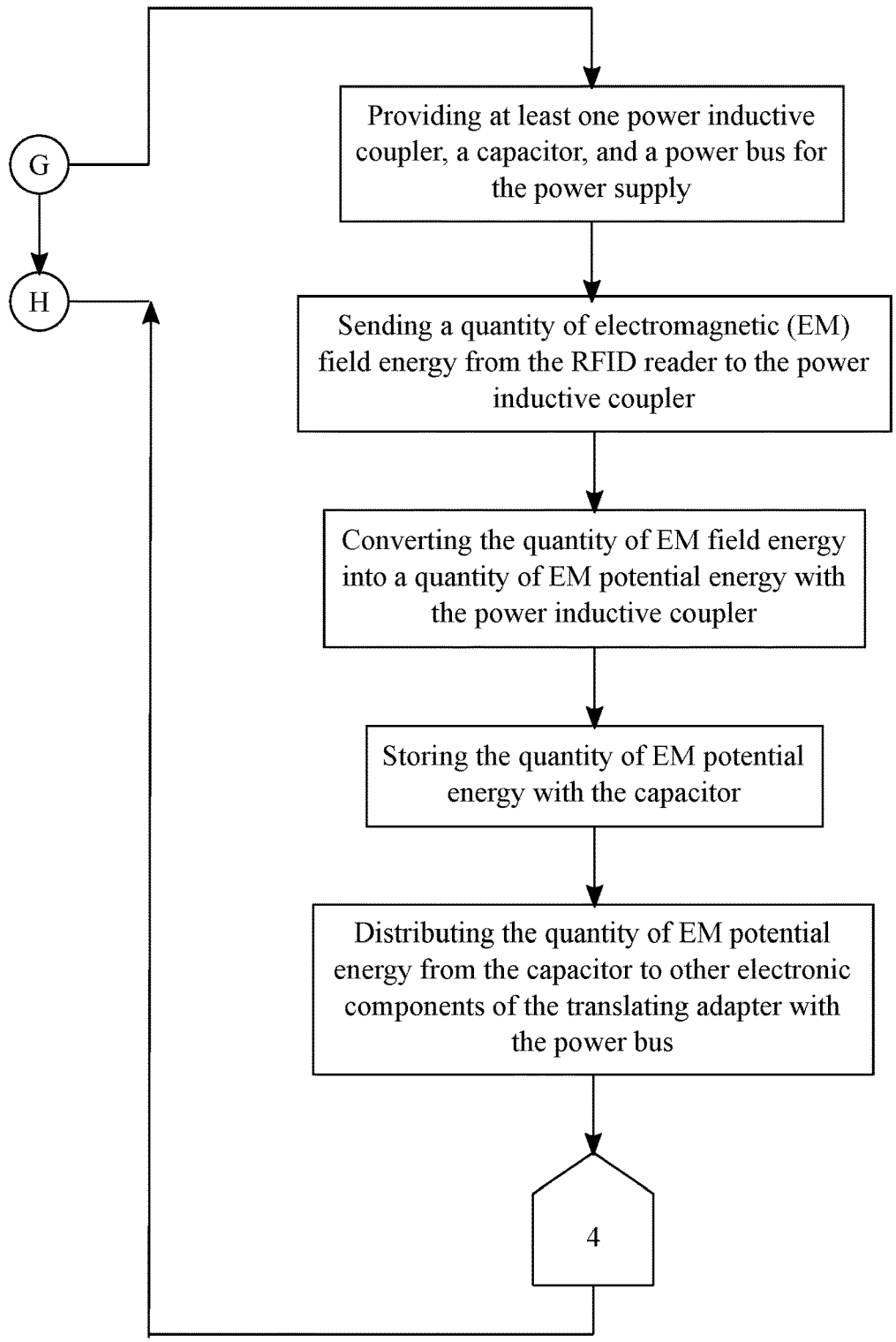
FIG. 3 is a flowchart illustrating the process of distributing a quantity of EM potential energy.
Figure 4:
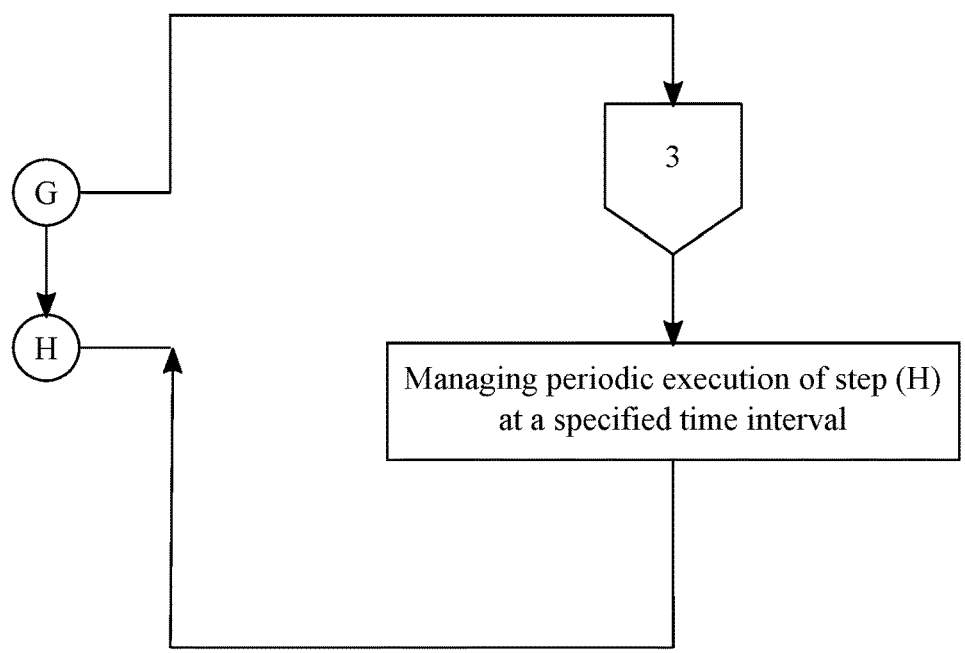
FIG. 4 is a flowchart illustrating the process of managing periodic execution of step (H).
Figure 5:
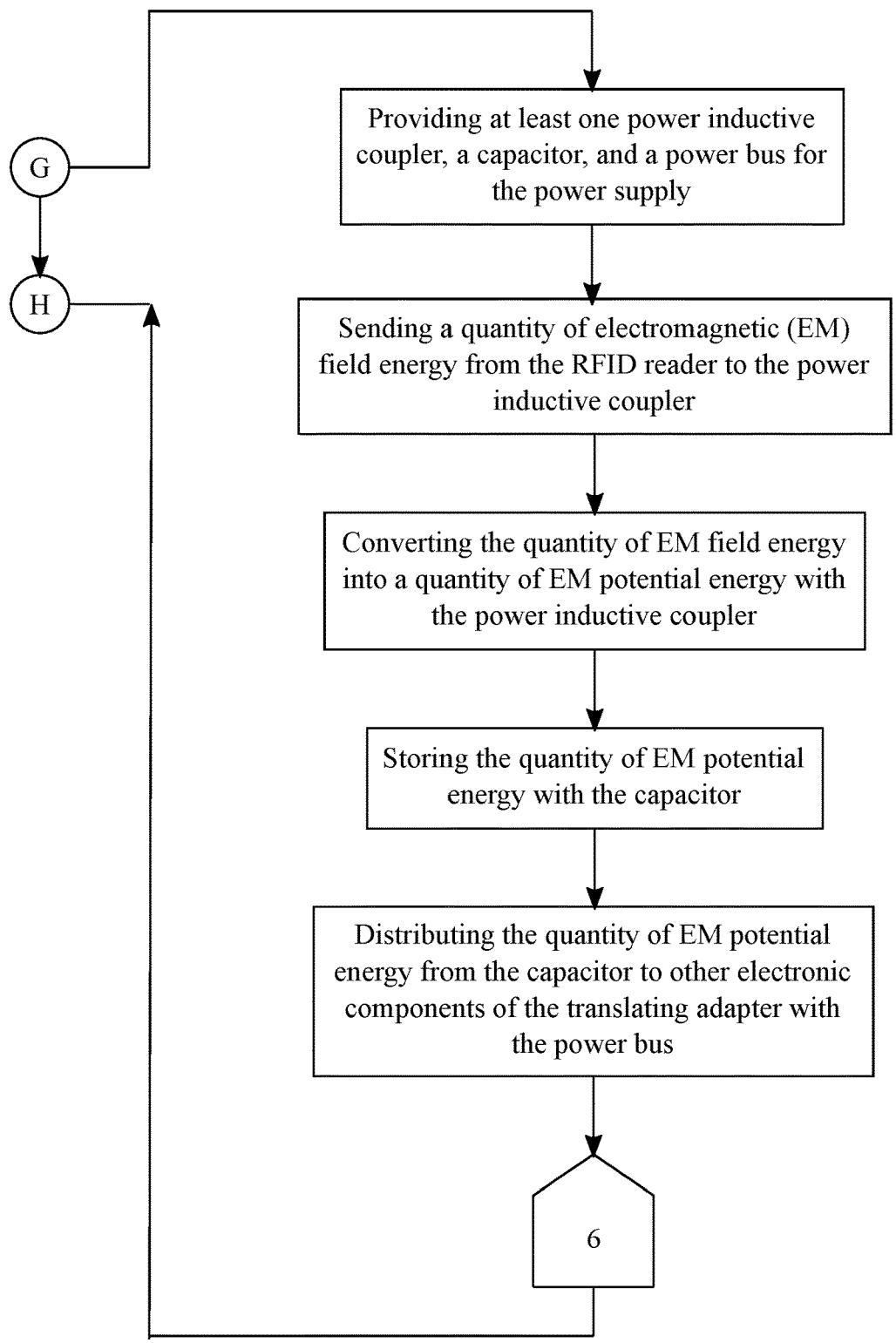
FIG. 5 is a flowchart illustrating the process of distributing a quantity of EM potential energy.

The translating adapter 3 effectively harnesses power from the RFID reader 1 as a quantity of electromagnetic (EM) field energy from the RFID reader 1 is sent to the at least one power inductive coupler 6 in order to utilize the RFID reader 1 to power the translating adapter 3, as shown in FIG. 3 and FIG. 5. Then, the quantity of EM field energy is converted into a quantity of EM potential energy with the at least one power inductive coupler 6 so that the EM field energy is compatible with the electronic components of the translating adapter 3. The quantity of EM potential energy is stored with the capacitor 7 and is distributed from the capacitor 7 to other electronic components of the translating adapter 3 with the power bus 8. Only components necessary for a specific operation are powered and at other times are electrically disabled to preserve power and directs the maximum of potential energy to the capacitor 7. More specifically, as shown in FIG. 4, the periodic execution of step (H) is managed at a specific time interval as to not interfere with the RFID simultaneous transmission. The harvesting of a quantity of electrical power from the RFID reader 1 while executing RFID operations results in poor communication or no communication between the RFID reader 1 and the portable computing device 15. The harvesting of the quantity of electrical power also interferes with small RFID cards that communicate directly with the RFID reader 1. Disabling the harvesting of the quantity of electrical power allows the RFID reader 1 to communicate with the translating adapter 3. In the preferred embodiment of the present invention, the specific time interval of the periodic execution of step (H) is defined by a power duty cycle. More specifically, the duty cycle is preferably 20 percent.

Figure 6:
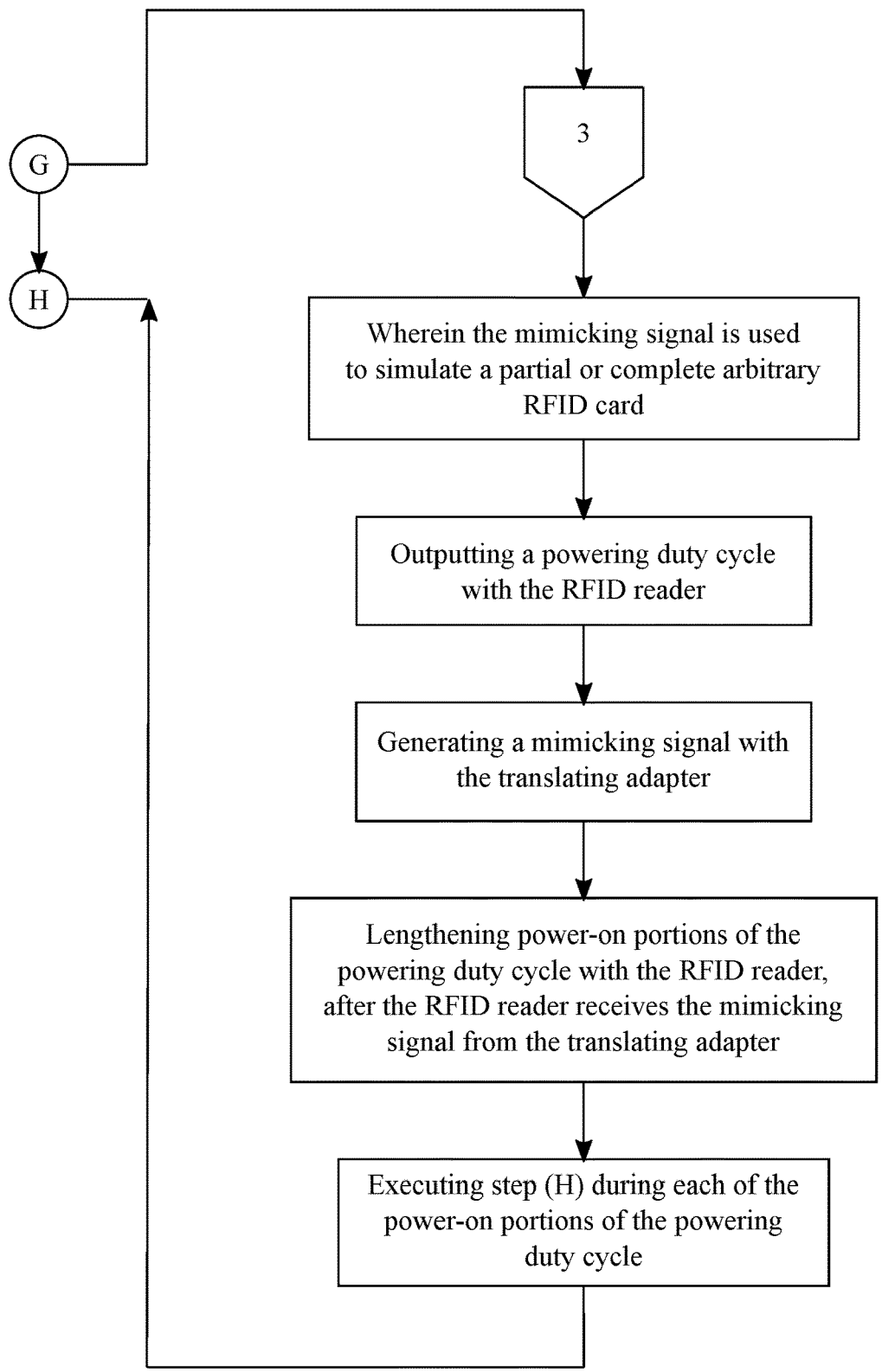
FIG. 6 is a flowchart illustrating the process of executing step (H) during each of the power-on portions of the powering duty cycle.

In order for the translating adapter 3 to maximize the power retrieved from the RFID reader 1, the translating adapter 3 utilizes a power duty cycle that is outputted with the RFID reader 1, as shown in FIG. 6. A mimicking signal is generated with the translating adapter 3, wherein the mimicking signal is used to simulate a partial or complete arbitrary RFID card in order to activate power duty cycle of the RFID reader 1. The power-on portions of the powering duty cycle with the RFID reader 1 are lengthened, giving the translating adapter 3 the opportunity to harness more power from the RFID reader 1. Moreover, step (H) is executed during each of the power-on portions of the powering duty cycle.

Figure 7:
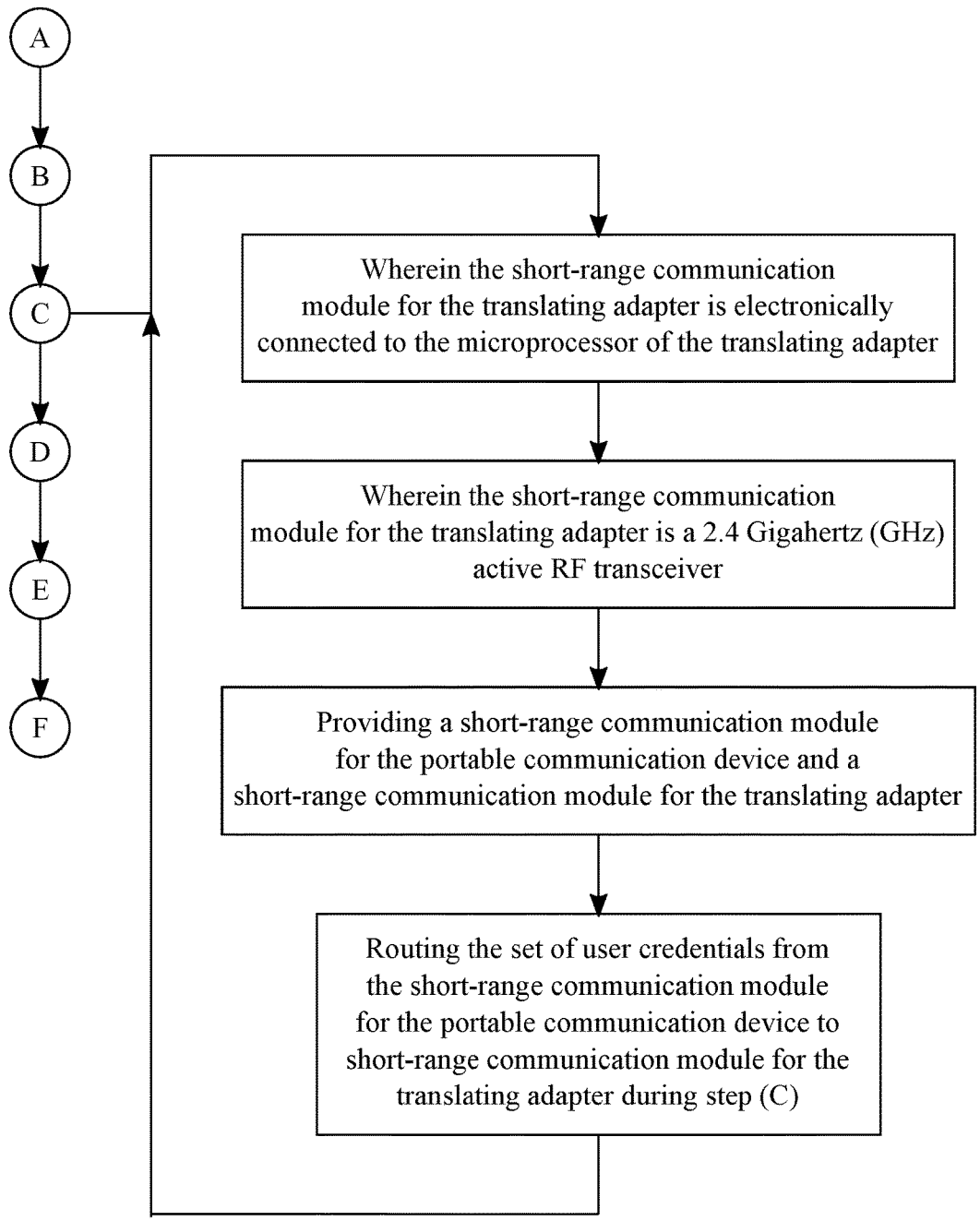
FIG. 7 is a flowchart illustrating the process of routing the set of user credentials from the short-range communication module for the portable communication device to the short-range communication module for the translating adapter.

The physical system of the present invention further includes a Short-range communication module 16 for the portable computing device 15 and a short-range communication module 9 for the translating adapter 3, each of which facilitate the delivery of the set of user credentials 18 from the portable computing device 15 to the translating adapter 3, as shown in FIG. 7. More specifically, the short-range communication module 9 for the translating adapter 3 is electronically connected to the microprocessor 4 of the translating adapter 3 in order for the short-range communication module 9 for the translating adapter 3 to receive the set of user credentials 18 and deliver the set of user credentials 18 to the microprocessor 4. The short-range communication module 16 for the portable computing device 15 and the short-range communication module 9 for the translating adapter 3 allow the set of user credentials 18 to be transmitted between the portable computing device 15 and the translating adapter 3 over Bluetooth signals. The set of user credentials 18 from the short-range communication module 16 for the portable computing device 15 to the short-range communication module 9 for the translating adapter 3 is routed during step (C).

More specifically, the bidirectional communication between the portable computing device 15 and the RFID reader 1 supports the emulation of microprocessor based credentials such as ISO7816 based credentials including NIST 800-73, ICAO contactless passports and contactless credit card smartcards. In the preferred embodiment of the present invention, the Short-range communication module 9 for the translating adapter 3 is a 2.4 Gigahertz (GHz) active Radio Frequency transceiver, accommodating a variety portable computing devices that are Bluetooth compatible. Furthermore, in the preferred embodiment of the present invention, the set of user credentials 18 is communicated as a set of application protocol data units (APDU). The translating adapter 3 receives the set of APDU as defined in ISO7816 from virtual smartcards that execute within the portable computing device 15. The translating adapter 3 converts the set of APDU encapsulated inside the Bluetooth packet into an RFID packet and transmits the APDU using the ISO14443 RFID modulation standard. The translating adapter 3 receives the set of APDU from the RFID magnetically inductive reader using the ISO 14443 RFID interface. The translating adapter 3 then converts the set of APDU from the RFID magnetically inductive reader into Bluetooth packets and sends the set of APDU to the portable computing device 15. This bidirectional exchange makes it possible for a non-ISO14443 RFID equipped portable computing device 15 to communicate with an ISO14443 RFID reader 1. Examples of ISO14443 readers include building access, computer access contactless desktop readers, transit fare ticket system, and point of sale NFC payment terminals.

Figure 8:
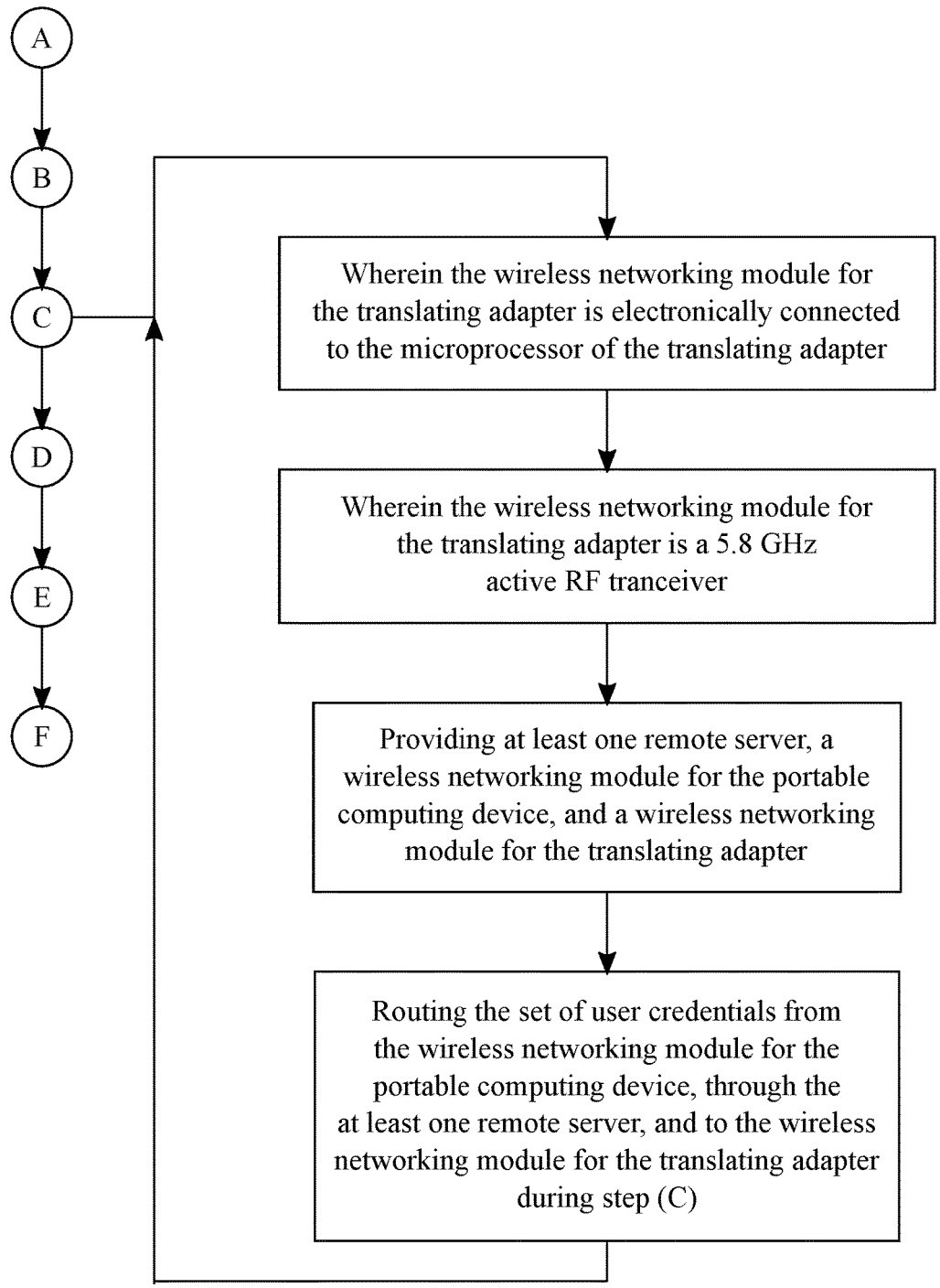
FIG. 8 is a flowchart illustrating the process of routing the set of user credentials from the wireless networking module for the portable computing device to the wireless networking module for the translating adapter.

In another embodiment of the present invention, an at least one remote server 20, a wireless networking module 17 for the portable computing device 15, and a wireless networking module 10 for the translating adapter 3 is provided, each of which facilitate the delivery of the set of user credentials 18 from the portable computing device 15 to the translating adapter 3, as shown in FIG. 8. More specifically, the wireless networking module 10 for the translating adapter 3 is electronically connected to the microprocessor 4 of the translating adapter 3 in order for the wireless networking module 10 for the translating adapter 3 to receive the set of user credentials 18 and deliver the set of user credentials 18 to the microprocessor 4. The at least one remote server 20, the wireless networking module 17 for the portable computing device 15, and the wireless networking module 10 for the translating adapter 3 allow the set of user credentials 18 to be transferred over Wi-Fi signals. The set of user credentials 18 from the wireless networking module 17 for the portable computing device 15 is routed, through at least one remote server 20, and to the wireless networking module 10 for the translating adapter 3 during step (C). In the preferred embodiment of the present invention, the wireless networking module 10 for the translating adapter 3 is a 2.4 GHz or 5.8 GHz active RF transceiver, accommodating a variety of portable computing devices that are Wi-Fi compatible.

Figure 9:
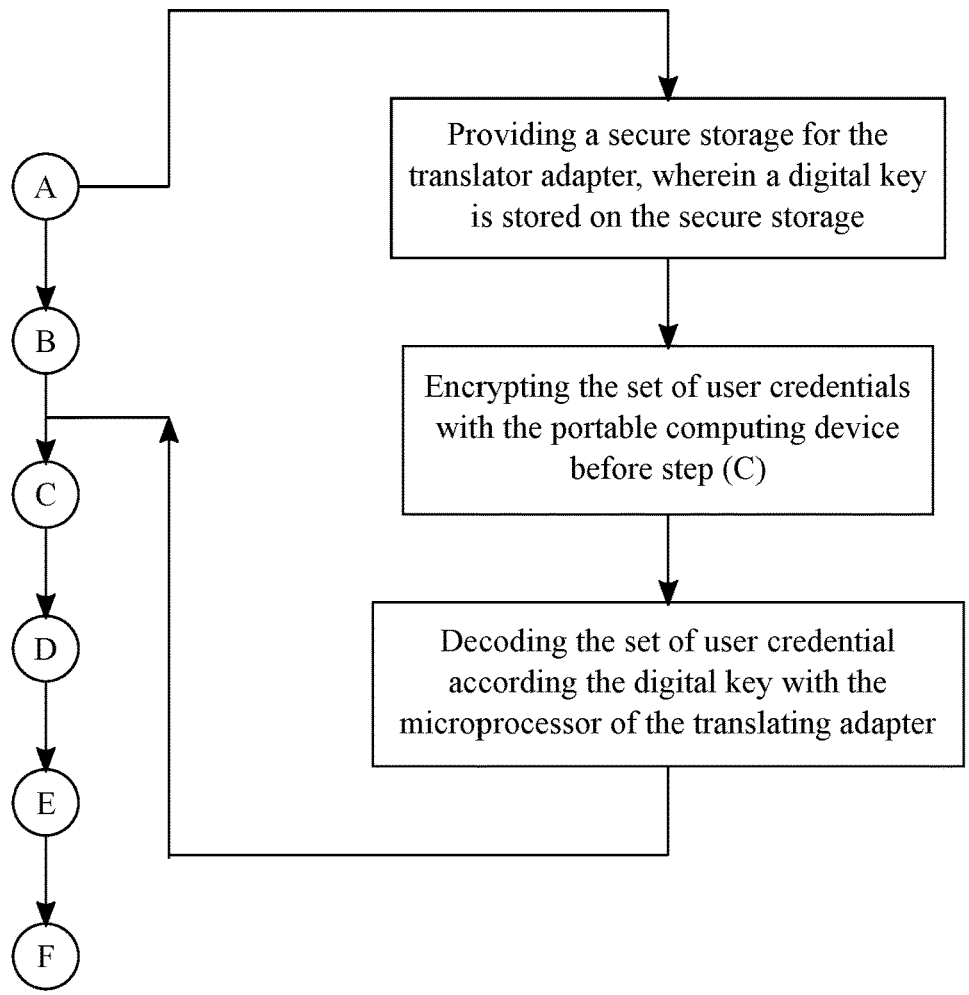
FIG. 9 is a flowchart illustrating the process of decoding the set of user credentials.

In order to protect the set of user credentials 18 that is delivered from the portable computing device 15 to the translating adapter 3, the present invention further includes a secure storage for the translating adapter 3, wherein a digital key is stored on the secure storage, as shown in FIG. 9. The set of user credentials 18 is encrypted with the portable computing device 15 before step (C) and is decoded according to the digital key with the microprocessor 4 of the translating adapter 3. The microprocessor 4 of the translating adapter 3 is able to safely process the set of user credentials 18 of the portable computing device 15.

Figure 10:
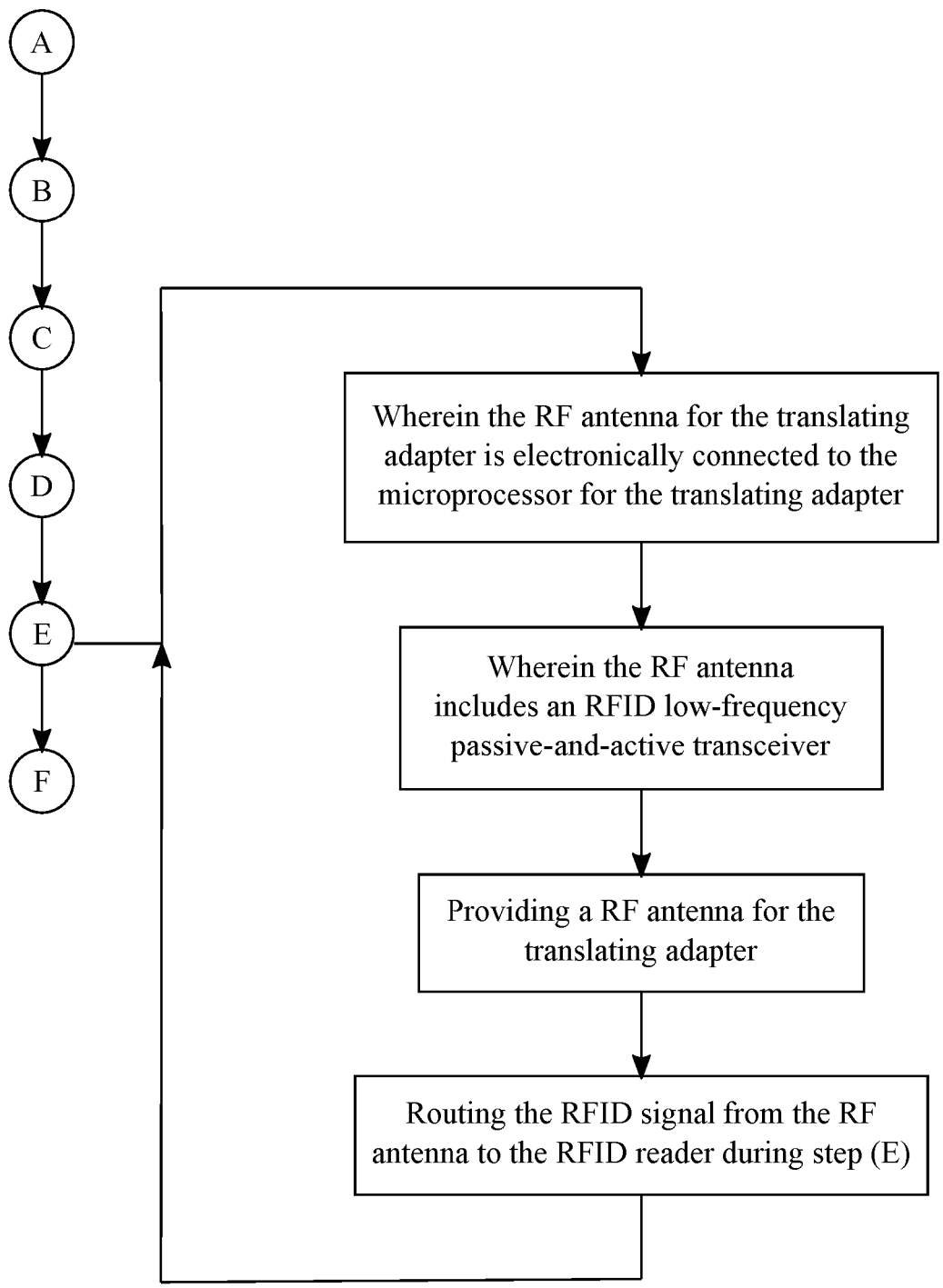
FIG. 10 is a flowchart illustrating the process of routing the RFID signal from the RFID magnetically inductive antenna to the RFID reader, when the RFID magnetically inductive antenna includes a RFID low-frequency passive-and-active transceiver.
Figure 11:
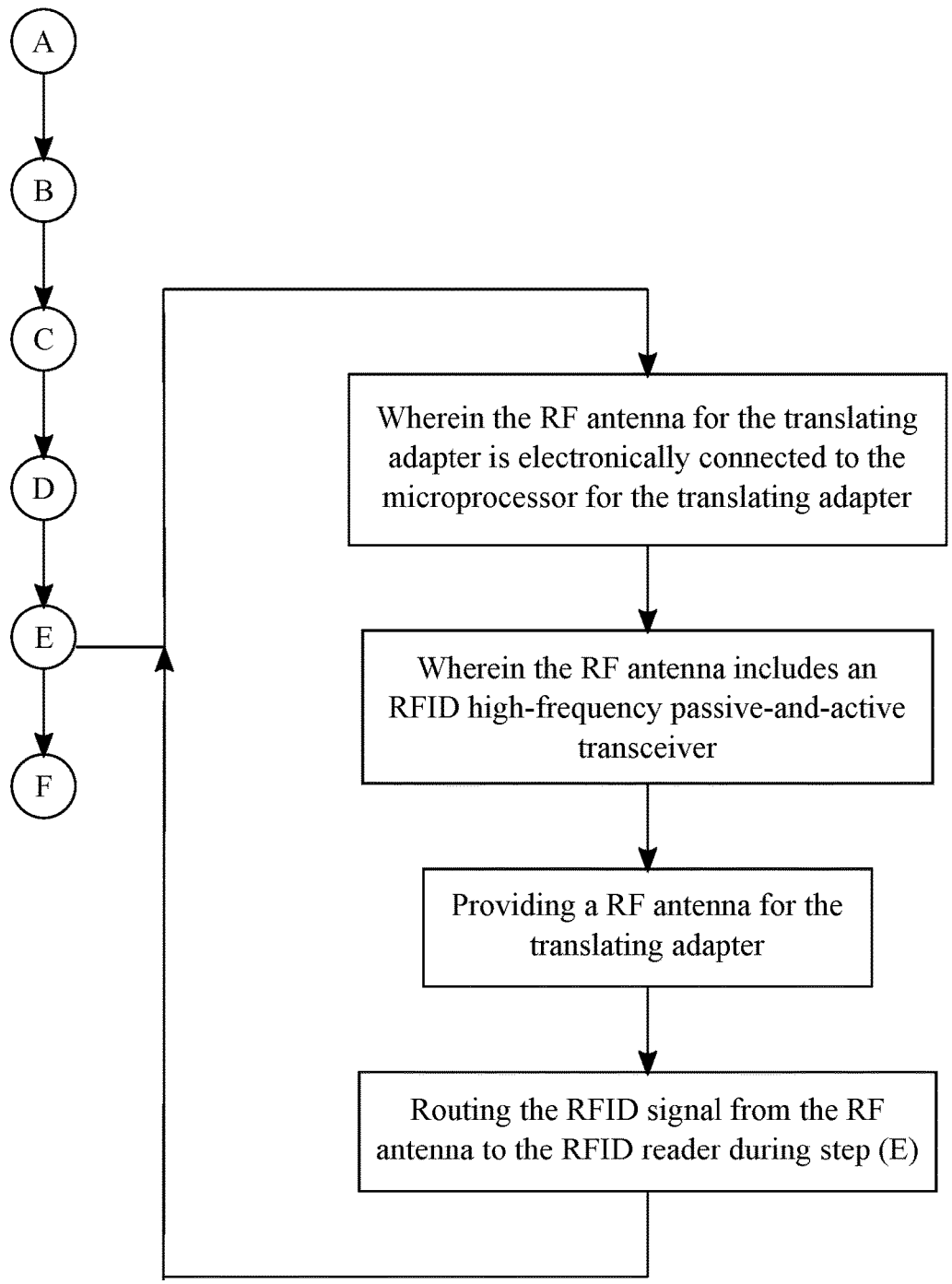
FIG. 11 is a flowchart illustrating the process of routing the RFID signal from the RFID magnetically inductive antenna to the RFID reader, when the RFID magnetically inductive antenna includes a RFID high-frequency passive-and-active transceiver.

Upon the conversion of the set of user credentials 18 into an RFID signal, the set of user credentials 18 is compatible with the RFID reader 1 and is transferred from the translating adapter 3 to the RFID reader 1 via a RFID magnetically inductive antenna 11. The RFID magnetically inductive antenna 11 for the translating adapter 3 allows the translating adapter 3 to communicate with the RFID reader 1. More specifically, the RFID magnetically inductive antenna 11 for the translating adapter 3 is electronically connected to the microprocessor 4 for the translating adapter 3 in order to receive the decoded and converted set of user credentials 18. The RFID signal from the RFID magnetically inductive antenna 11 is routed to the RFID reader 1 during step (E). In an embodiment of the present invention, the RFID magnetically inductive antenna 11 includes an RFID low-frequency passive-and-active transceiver 12, as shown in FIG. 10. In another embodiment, the RFID magnetically inductive antenna 11 includes an RFID high-frequency passive-and-active transceiver 13, as shown in FIG. 11.

In the preferred embodiment, the RFID magnetically inductive antenna 11 includes a first antenna and a second antenna. The first antenna corresponds to a RFID magnetic couple frequency of 125 kHz. The first antenna is a copper wire of 20 AWG or smaller wound to form a loop of wire that is flat in orientation as to have a height of less than 2 mm. The second antenna corresponds to a RFID magnetic coupling frequency of 13.56 Mhz. The second antenna is a thin film loop inductive antenna tuned to approximately 13.56 MHz and has an inductance of less than 3.5 UH. The second antenna includes a ferrite backing which shields the second antenna from the main circuit board and any capacitor 7 or battery. In the preferred embodiment of the present invention, which utilizes dual harvesting, the first antenna is wound around the outside edge of the second antenna so as not to cross the antennas.

Figure 12:
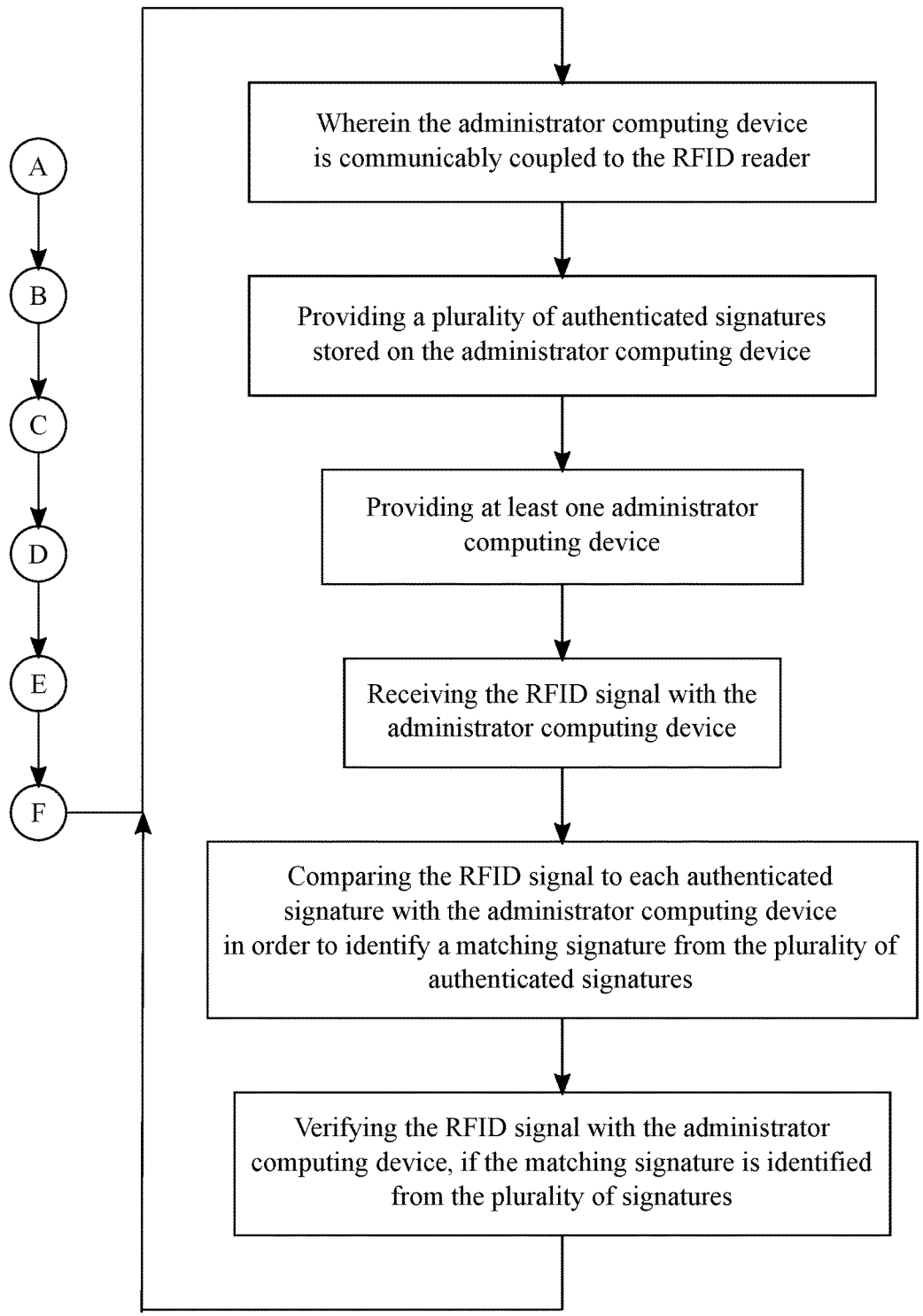
FIG. 12 is a flowchart illustrating the process of verifying the RFID signal.

In order to verify the set of user credentials 18, the physical system of the present invention further includes at least one administrator computing device 19 and a plurality of authenticated signatures 2, as shown in FIG. 12. The at least one administrator device executes the authentication process and is communicably coupled to the RFID reader 1. The plurality of authenticated signatures 2 is stored on the administrator computing device. The RFID signal is received with the administrator computing device and is compared to each authenticated signature with the administrator computing device in order to identify a matching signature from the plurality of authenticated signatures 2. The RFID signal is verified with the administrator computing device, if the matching signature is identified from the plurality of signatures. The user is then able to active the corresponding door or entrance mechanism via his or her portable computing device 15.

Figure 13:
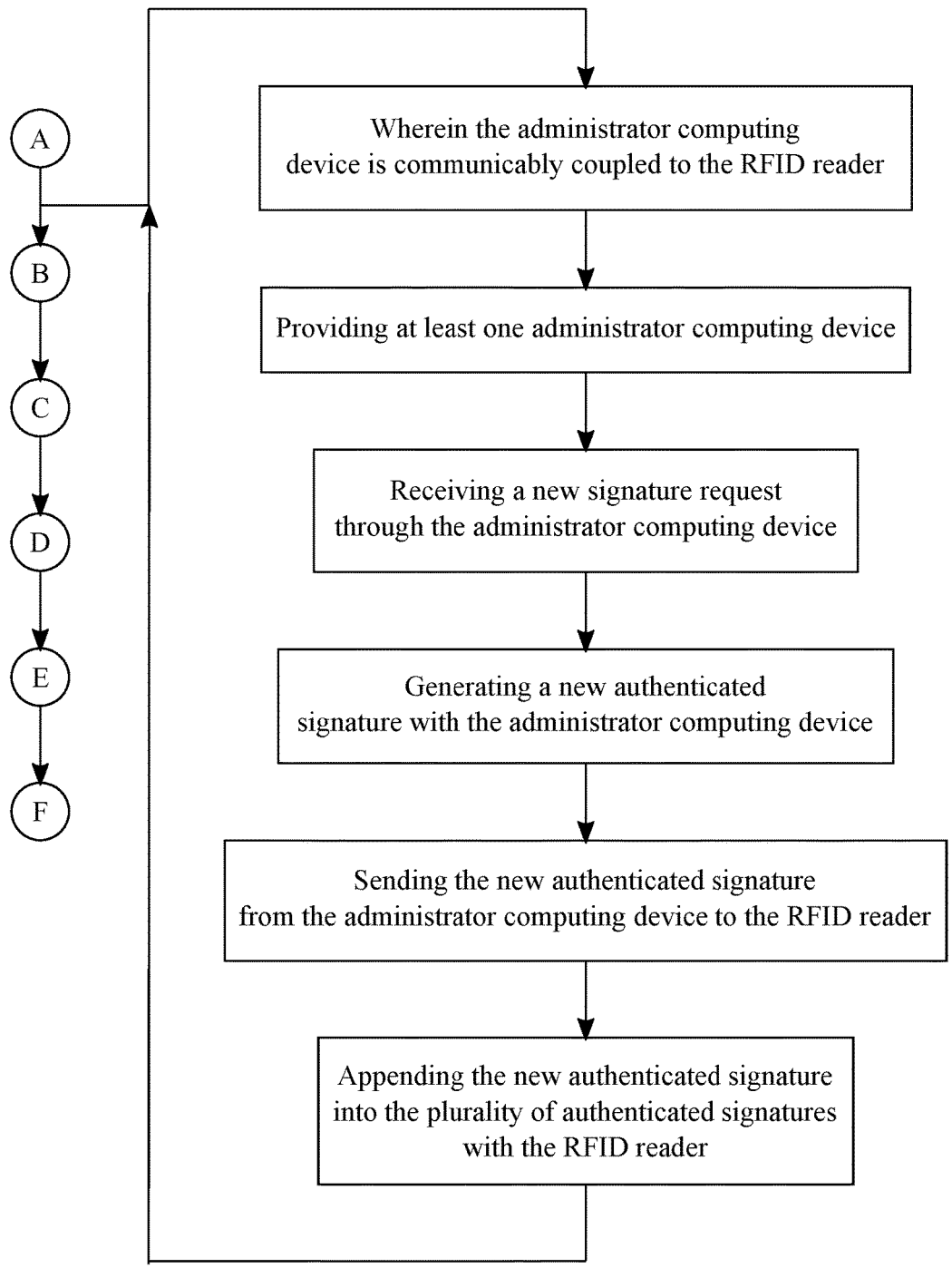
FIG. 13 is a flowchart illustrating the process of appending the new authenticated signature into the plurality of authenticated signatures.

As a plurality of portable computing devices are compatible with at least one RFID reader 1, each portable computing device 15 must be registered with at least one administrator computing device 19. More specifically, the administrator computing device is communicably coupled to the RFID reader 1, as shown in FIG. 13. The administrator computing device may also be a smartphone; however, the administrator computing device is preferably a computer or tablet that is managed by an authorized individual. In order to register a new portable computing device 15, a new signature request is received through the administrator computing device. A new authenticated signature is generated with the administrator computing device and is sent from the administrator computing device to the RFID reader 1. The new authenticated signature is appended into the plurality of authenticated signatures 2 with the RFID reader 1 so that the set of user credentials 18 of a corresponding portable computing device 15 may register with RFID reader 1.

Figure 14:
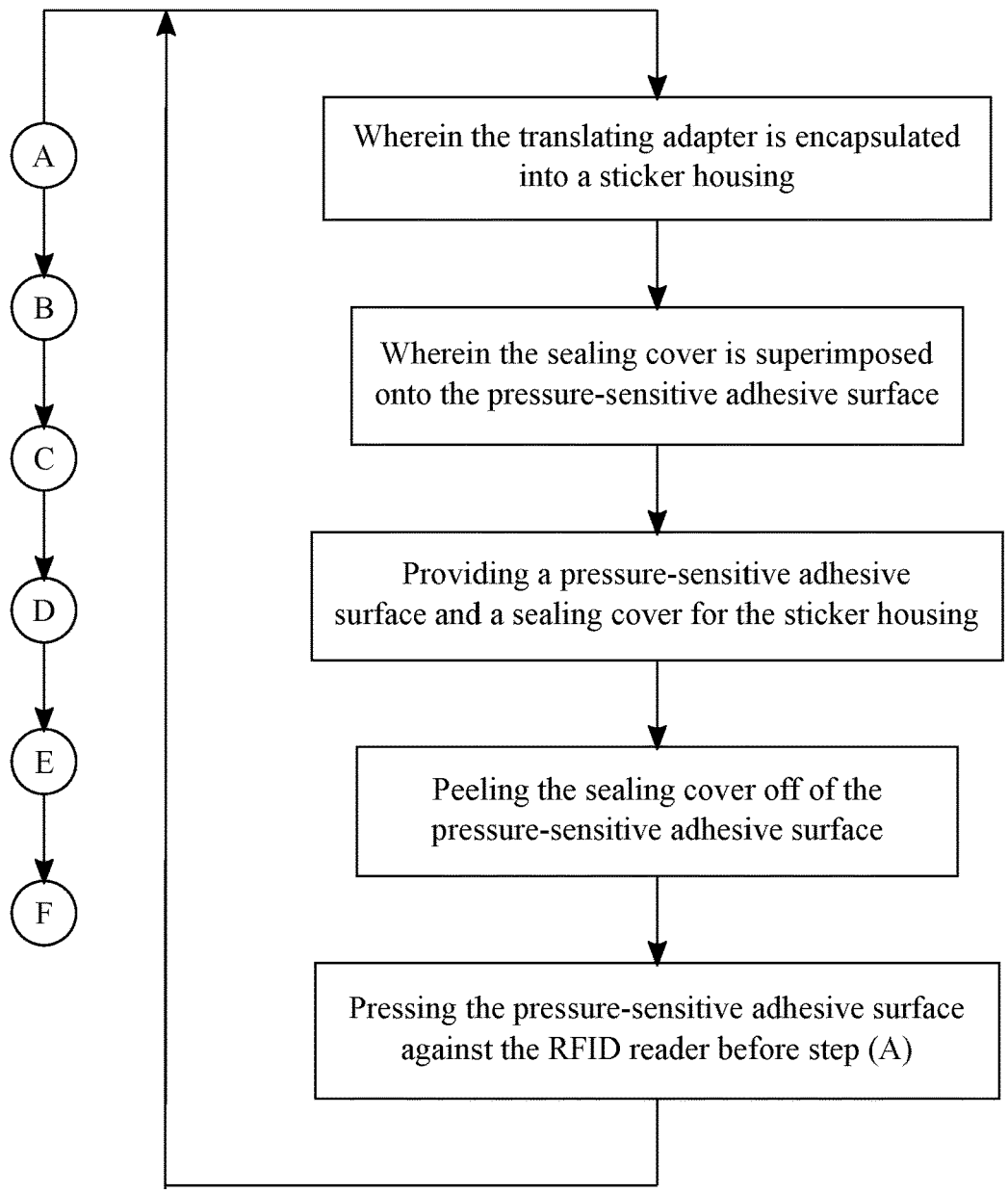
FIG. 14 is a flowchart illustrating the process of mounting the translating adapter onto the RFID reader, when the translating adapter is encapsulated into a sticker housing.
Figure 15:
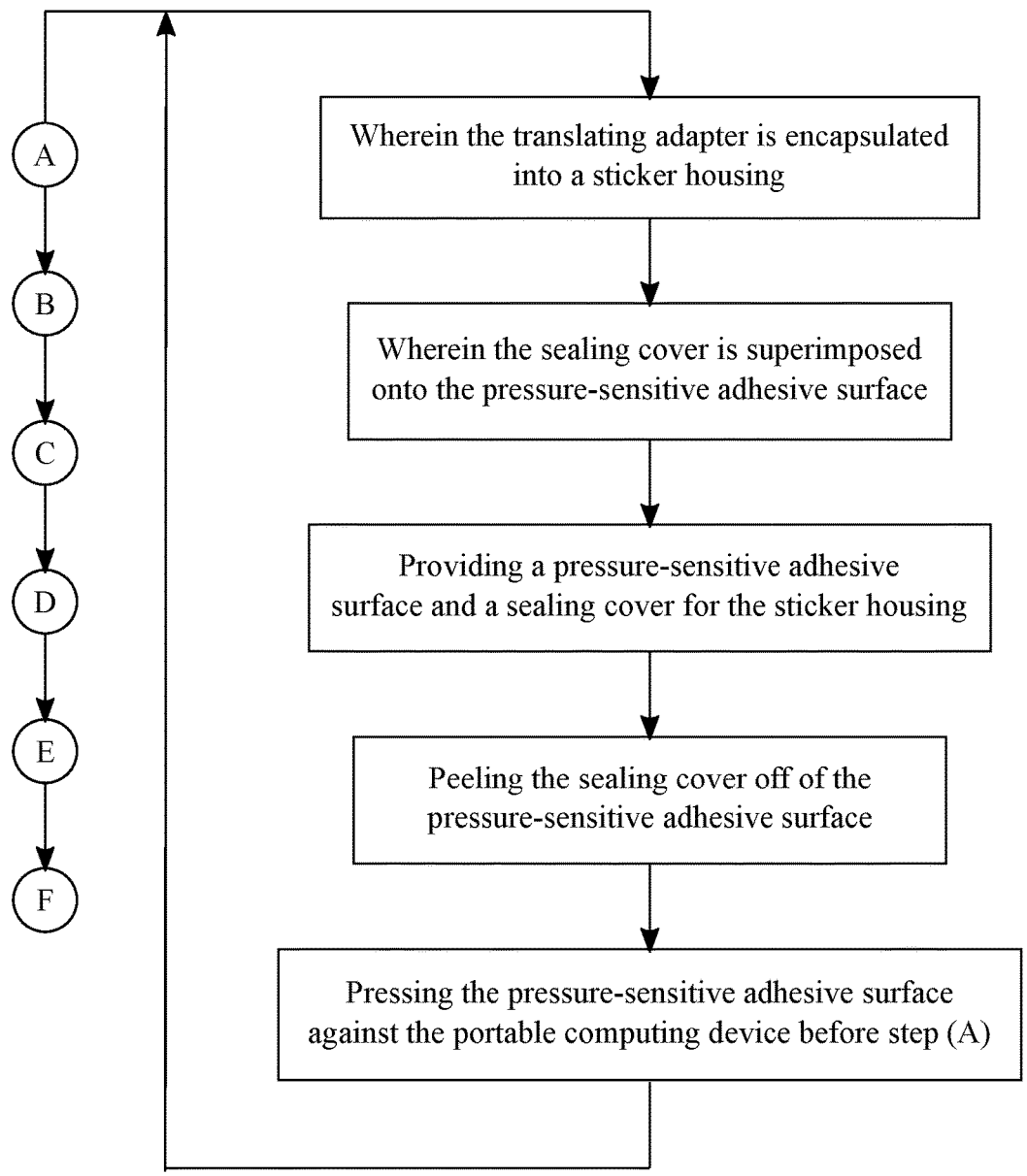
FIG. 15 is a flowchart illustrating the process of mounting the translating adapter onto the portable computing device, when the translating adapter is encapsulated into a sticker housing.
Figure 16:
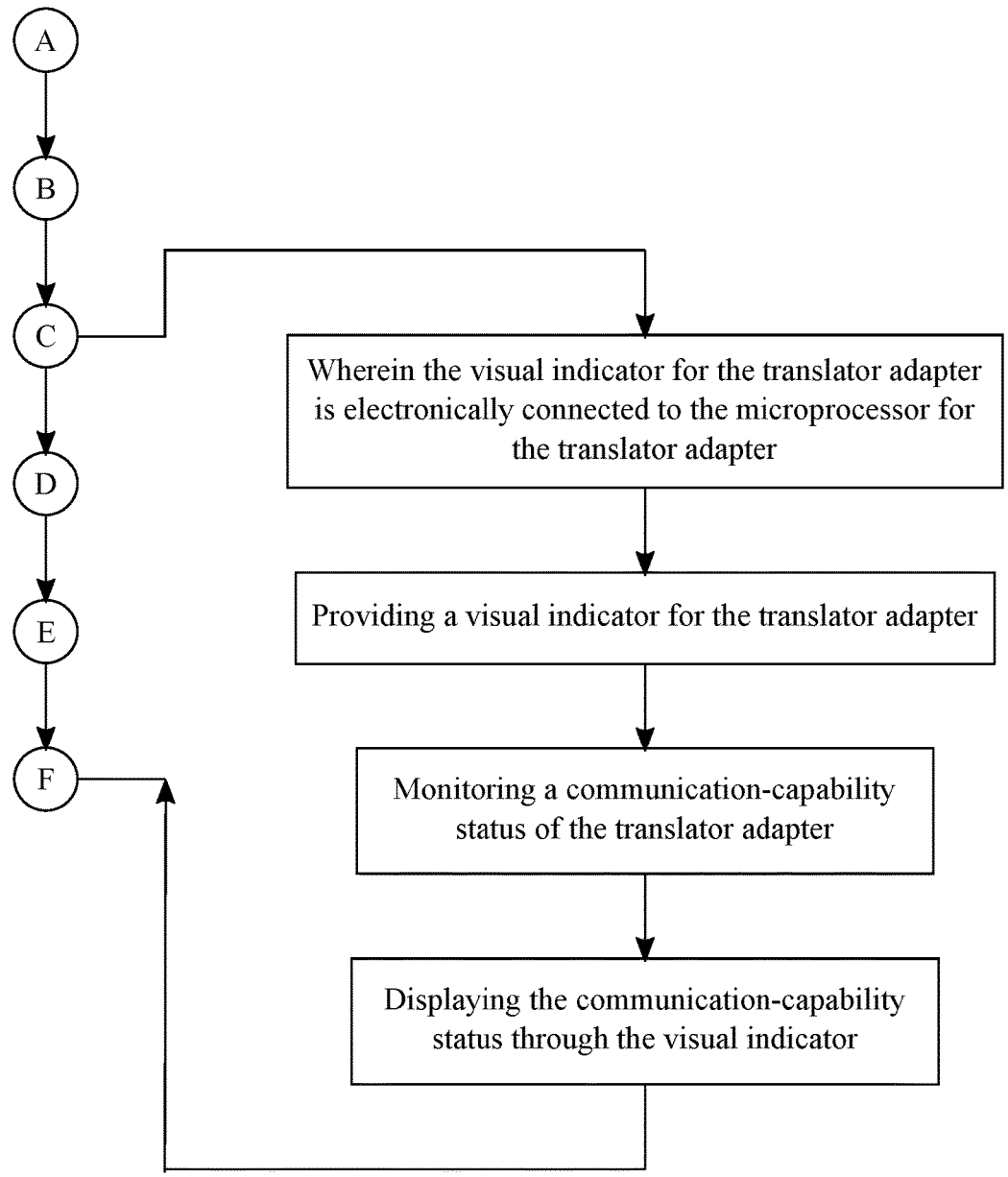
FIG. 16 is a flowchart illustrating the process of displaying the communication-capability status through the visual indicator, when the visual indicator for the translator adapter is electronically connected to the microprocessor.
Figure 17:
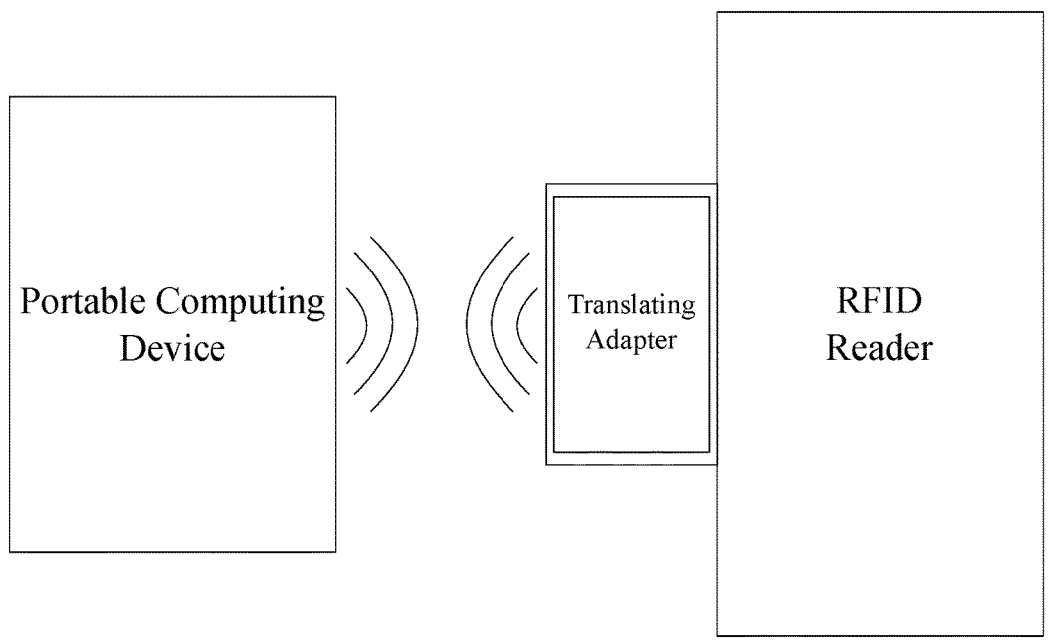
FIG. 17 is a schematic view of the communication between the portable computing device and the translating adapter.
Figure 18:
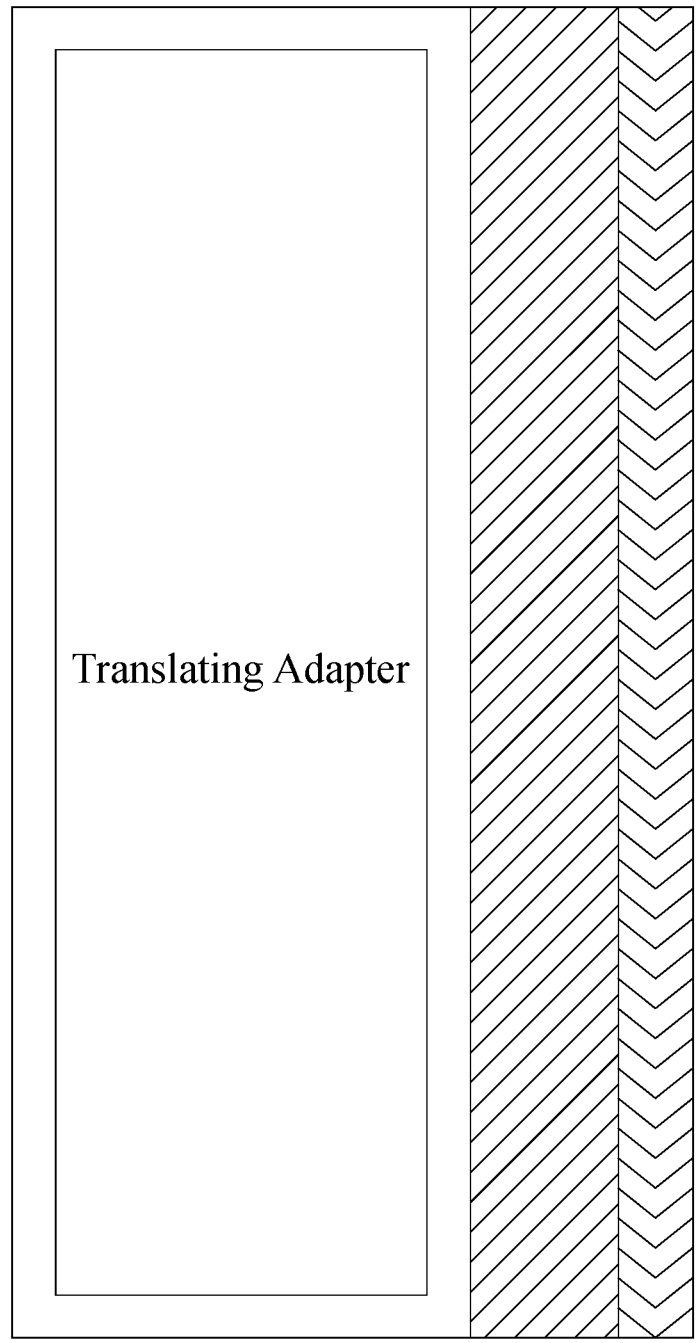
FIG. 18 is a schematic view of the translating adapter and the sticker housing.
Figure 19:
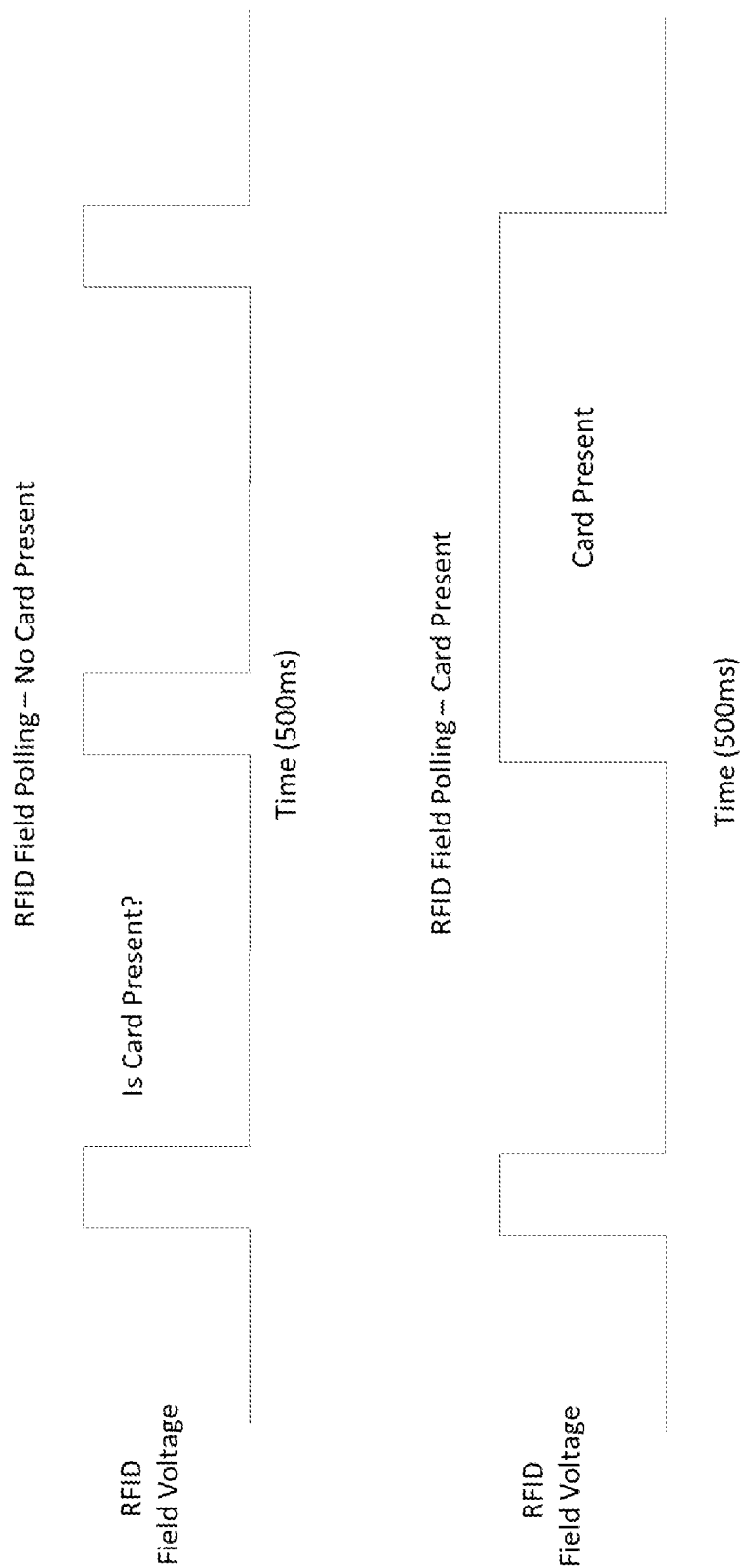
FIG. 19 is a schematic view of two waveforms which demonstrate how an RFID Host reader detects the presence of a card and adjust the power the Reader generates into the magnetic field. This schematic view further reveals how the translating device uses this method to encourage the RFID reader to deliver more energy to the translating devices power supply by simulating the header of an RFID card whereby the RFID Reader sees a misread and continue to deliver power to the field.

The physical system of the present invention preferably includes a sticker housing 21. More specifically, the translating adapter 3 is encapsulated into the sticker housing 21 allowing the translating adapter 3 to be easily and quickly mounted onto a variety of RFID readers 1, FIG. 14. Furthermore, a pressure-sensitive adhesive surface 22 and a sealing cover 23 for the sticker housing 21 allows the sticker housing 21 to be detachably attached to the RFID reader 1 and prevents the sticker housing 21 from attaching to any other undesired surface, respectively. The sealing cover 23 is superimposed onto the pressure-sensitive adhesive surface 22 in order to cover the entirety of the pressure-sensitive adhesive surface 22 until the sticker housing 21 is mounted onto the RFID reader 1. In order to mount the sticker housing 21, the sealing cover 23 is peeled off of the pressure-sensitive adhesive surface 22. The pressure-sensitive adhesive surface 22 is pressed against the RFID reader 1 before step (A) so that the RFID magnetically inductive antenna 11 of the translating adapter 3 is able to communicate with the RFID reader 1. In another embodiment of the present invention, the pressure-sensitive adhesive surface 22 is pressed against the portable computing device 15 before step (A). In this alternate embodiment, each portable computing device 15 is attached to a corresponding translating adapter 3.

The physical system of the present invention further includes a visual indicator 14 for the translating adapter 3 in order to alert the user communication between the portable computing device 15 and the RFID reader 1 via the translating adapter 3. The visual indicator 14 for the translating adapter 3 is electronically connected to the microprocessor 4 for the translating adapter 3 as the RFID magnetically inductive antenna 11 is electronically connected to the microprocessor 4. A communication-capability status of the translating adapter 3 is monitored in order to alert the user that the portable computing device 15 communicated with the translating adapter 3. Moreover, the communication-capability status is displayed through the visual indicator 14 in order to alert the user of the verification of the set of user credentials 18 of the portable computing device 15 by the RFID reader 1. In an alternate embodiment of the present invention the visual indicator 14 may also monitor and display the communication-strength status of the translator adapter with that of the portable computing device 15.

Although the invention has been explained in relation to its preferred embodiment, it is to be understood that many other possible modifications and variations can be made without departing from the spirit and scope of the invention as hereinafter claimed.

What is claimed is:

1. A method of providing a gateway between a mobile devices and radio frequency identification (RFID) enabled readers, the method comprises the steps of:
   (A) providing a RFID reader, a translating adapter, and a portable computing device;
   (B) providing a set of user credentials stored on the portable computing device;
   (C) sending the set of user credentials from the portable computing device to the translating adapter, if the portable computing device is positioned proximal to the translating adapter;
   (D) converting the set of user credentials into an RFID signal with a microprocessor of the translating adapter;
   (E) sending the RFID signal from the translating adapter to the RFID reader;
   (F) executing an authentication process for the RFID signal, after the RFID reader receives the RFID signal;
   (G) providing a power supply for the translator adapter;
   (H) inductively harvesting a quantity of electrical power from the RFID reader to the power supply before or after step (E);
      outputting a powering duty cycle with the RFID reader;
      generating a mimicking signal with the translating adapter, wherein the mimicking signal is used to simulate a partial or complete arbitrary RFID card;
      lengthening power-on portions of the powering duty cycle with the RFID reader, after the RFID reader receives the mimicking signal from the translating adapter; and
      executing step (H) during each of the power-on portions of the powering duty cycle.

2. The method of providing a gateway between mobile devices and traditional RFID enabled readers, the method as claimed in claim 1 comprises the steps of:
   providing at least one power inductive coupler, a capacitor, and a power bus for the power supply;
   sending a quantity of electromagnetic (EM) field energy from the RFID reader to the power inductive coupler;
   converting the quantity of EM field energy into a quantity of EM potential energy with the power inductive coupler;
   storing the quantity of EM potential energy with the capacitor; and
   distributing the quantity of EM potential energy from the capacitor to other electronic components of the translating adapter with the power bus.

3. The method of providing a gateway between mobile devices and traditional RFID enabled readers, the method as claimed in claim 1 comprises the steps of:
   managing periodic execution of step (H) at a specified time interval.

4. The method of providing a gateway between mobile devices and traditional RFID enabled readers, the method as claimed in claim 1 comprises the steps of:
   providing a short-range communication module for the portable communication device and a short-range communication module for the translating adapter, wherein the short-range communication module for the translating adapter is electronically connected to the microprocessor of the translating adapter; and
   routing the set of user credentials from the short-range communication module for the portable communication device to short-range communication module for the translating adapter during step(C).

5. The method of providing a gateway between mobile devices and traditional RFID enabled readers, the method as claimed in claim 4, wherein the short-range communication module for the translating adapter is a 2.4 Gigahertz (GHz) active RF transceiver.

6. The method of providing a gateway between mobile devices and traditional RFID enabled readers, the method as claimed in claim 4, wherein the set of user credentials is communicated as a set of application protocol data units (APDU).

7. The method of providing a gateway between mobile devices and traditional RFID enabled readers, the method as claimed in claim 1 comprises the steps of:
   providing at least one remote server, a wireless networking module for the portable computing device, and a wireless networking module for the translating adapter, wherein the wireless networking module for the translating adapter is electronically connected to the microprocessor of the translating adapter; and
   routing the set of user credentials from the wireless networking module for the portable computing device, through the at least one remote server, and to the wireless networking module for the translating adapter during step (C).

8. The method of providing a gateway between mobile devices and traditional RFID enabled readers, the method as claimed in claim 5, wherein the wireless networking module for the translating adapter is 5.8 GHz active RF transceiver.

9. The method of providing a gateway between mobile devices and traditional RFID enabled readers, the method as claimed in claim 1 comprises the steps of:
   providing a secure storage for the translator adapter, wherein a digital key is stored on the secure storage;
   encrypting the set of user credentials with the portable computing device before step (C); and
   decoding the set of user credential according the digital key with the microprocessor of the translating adapter.

10. The method of providing a gateway between mobile devices and traditional RFID enabled readers, the method as claimed in claim 1 comprises the steps of:
    providing a RFID magnetically inductive antenna for the translating adapter, wherein the RFID magnetically inductive antenna for the translating adapter is electronically connected to the microprocessor for the translating adapter; and
    routing the RFID signal from the RFID magnetically inductive antenna to the RFID reader during step (E).

11. The method of providing a gateway between mobile devices and traditional RFID enabled readers, the method as claimed in claim 10, wherein the RFID magnetically inductive antenna includes an RFID low-frequency passive-and-active transceiver.

12. The method of providing a gateway between mobile devices and traditional RFID enabled readers, the method as claimed in claim 10, wherein the RFID magnetically inductive antenna includes an RFID high-frequency passive-and-active transceiver.

13. The method of providing a gateway between mobile devices and traditional RFID enabled readers, the method as claimed in claim 1 comprises the steps of:

providing at least one administrator computing device, wherein the administrator computing device is communicably coupled to the RFID reader;

providing a plurality of authenticated signatures stored on the administrator computing device;

receiving the RFID signal with the administrator computing device;

comparing the RFID signal to each authenticated signature with the administrator computing device in order to identify a matching signature from the plurality of authenticated signatures; and verifying the RFID signal with the administrator computing device, if the matching signature is identified from the plurality of signatures.

14. The method of providing a gateway between mobile devices and traditional RFID enabled readers, the method as claimed in claim 1 comprises the steps of:

providing at least one administrator computing device, wherein the administrator computing device is communicably coupled to the RFID reader;

receiving a new signature request through the administrator computing device;

generating a new authenticated signature with the administrator computing device;

sending the new authenticated signature from the administrator computing device to the RFID reader; and appending the new authenticated signature into the plurality of authenticated signatures with the RFID reader.

15. The method of providing a gateway between mobile devices and traditional RFID enabled readers, the method as claimed in claim 1, wherein the translating adapter is encapsulated into a sticker housing.

16. The method of providing a gateway between mobile devices and traditional RFID enabled readers, the method as claimed in claim 15 comprises the steps:

providing a pressure-sensitive adhesive surface and a sealing cover for the sticker housing, wherein the sealing cover is superimposed onto the pressure-sensitive adhesive surface;

peeling the sealing cover off of the pressure-sensitive adhesive surface; and pressing the pressure-sensitive adhesive surface against the RFID reader before step (A).

17. The method of providing a gateway between mobile devices and traditional RFID enabled readers, the method as claimed in claim 15 comprises the steps:

providing a pressure-sensitive adhesive surface and a sealing cover for the sticker housing, wherein the sealing cover is superimposed onto the pressure-sensitive adhesive surface;

peeling the sealing cover off of the pressure-sensitive adhesive surface; and pressing the pressure-sensitive adhesive surface against the portable computing device before step (A).

18. The method of providing a gateway between mobile devices and traditional RFID enabled readers, the method as claimed in claim 1, wherein the translating adapter is configured to be transparent or translucent.

19. The method of providing a gateway between mobile devices and traditional RFID enabled readers, the method as claimed in claim 1 comprises the steps:

providing a visual indicator for the translator adapter, wherein the visual indicator for the translator adapter is electronically connected to the microprocessor for the translator adapter;

monitoring a communication-capability status of the translator adapter; and displaying the communication-capability status through the visual indicator.

20. The method of providing a gateway between mobile devices and traditional RFID enabled readers, the method as claimed in claim 1, wherein the set of user credentials is provided in a readily-convertible-into-RFID format.

* * * * *